(12) United States Patent
Warashina et al.

(10) Patent No.: US 7,360,312 B2
(45) Date of Patent: Apr. 22, 2008

(54) BUSH CUTTER

(75) Inventors: Makoto Warashina, Wako (JP); Hideshi Sasaki, Wako (JP)

(73) Assignee: Honda Motor Co., Ltd. (JP)

( * ) Notice: Subject to any disclaimer, the term of this patent is extended or adjusted under 35 U.S.C. 154(b) by 252 days.

(21) Appl. No.: 10/867,866

(22) Filed: Jun. 15, 2004

(65) Prior Publication Data

US 2005/0000095 A1   Jan. 6, 2005

(30) Foreign Application Priority Data

Jul. 2, 2003   (JP)   ............................. 2003-190249
Jul. 2, 2003   (JP)   ............................. 2003-190288

(51) Int. Cl.
*B26B 7/00*   (2006.01)
(52) U.S. Cl. .......................................... 30/276; 56/17.5
(58) Field of Classification Search ................. 56/12.7, 56/17.5; 30/276, DIG. 5, 272.1
See application file for complete search history.

(56) References Cited

U.S. PATENT DOCUMENTS 2,635,410 A * 4/1953 Hill ............................. 56/377
2,702,978 A * 3/1955 Fowler ........................ 56/17.6
3,137,106 A * 6/1964 Griffith, Jr. .................. 451/352
3,781,991 A * 1/1974 Stretton et al. ............... 30/276
4,188,719 A * 2/1980 Hoff ............................. 30/122
4,936,757 A * 6/1990 Kambe et al. .............. 417/373
5,363,723 A * 11/1994 Hoffman .................... 74/606 R

FOREIGN PATENT DOCUMENTS

FR   2752788 A1 * 3/1998
JP   59157116      10/1984
JP   64047310       2/1989
SU   1700321 A  * 12/1991

* cited by examiner

*Primary Examiner*—Thomas B. Will
*Assistant Examiner*—Alicia Torres
(74) *Attorney, Agent, or Firm*—Adams & Wilks

(57) ABSTRACT

A bush cutter has a driving bevel gear housed in a first box constituting a part of a gearbox, and a driven bevel gear housed in a second box and engaging the driving bevel gear. The driving bevel gear is rotatably retained in a first bearing. The first bearing is screw-fitted into the first box movably in an axially longitudinal direction of the driving bevel gear. Rotation of the first bearing causes the driving bevel gear to move in the axially longitudinal direction to finely adjust the engagement of the driving bevel gear with the driven bevel gear.

9 Claims, 11 Drawing Sheets

BUSH CUTTER

FIELD OF THE INVENTION

The present invention relates to a bush cutter which allows fine adjustment of engagement between bevel gears provided within a gearbox of the bush cutter and supply of lubricating oil to bearings.

BACKGROUND OF THE INVENTION

Many of bush cutters conventionally known rotate a driving shaft inserted into a hollow handle pole by the drive from an engine provided at a proximal end portion of the handle pole, rotating a cutting blade via a bevel gear mechanism provide at a distal end portion of the driving shaft, and thereby cutting bushes. The bevel gear mechanism is housed in a gearbox provided at a distal end portion of the handle pole.

A bush cutter of this kind is disclosed, for example, in Japanese Patent Laid-Open Publication No. SHO-64-47310. A gear mechanism of this bush cutter will be described below with reference to FIG. 11.

Referring to FIG. 11, a driving bevel gear 204 is spline-connected with a distal end portion of a driving shaft 202 inserted into a handle pole 200. The driving bevel gear 204 is rotatably supported by a gearbox 208 via a bearing 206. The driving force of the driving bevel gear 204 is transmitted to a transmission gear mechanism 210. The transmission gear mechanism 210 consists of a shaft 212, an intermediate gear 214 mounted on the shaft 212 to engage the driving bevel gear 204, and a transmission bevel gear 216 mounted on a distal end portion of the shaft 212. The shaft 212 is rotatably supported at its proximal end portion by a cylinder 220 via a bearing 218.

The transmission bevel gear 216 engages two bevel gears, a first output bevel gear 232 mounted on a first output shaft 230 and a second output bevel gear 236 mounted on a second output shaft 234 rotatably fitted onto the periphery of the first output shaft 230. The first output bevel gear 232 and the second output bevel gear 236 rotate in opposite directions to one another.

The first output shaft 230 has a lower cutting blade 240 mounted on its lower end portion. The second output shaft 234 has an upper cutting blade 242 mounted on its lower end portion.

Drive from an engine not shown rotates the driving bevel gear 204 via the driving shaft 202. The rotation is transmitted to the first output bevel gear 232 and the second output bevel gear 236 via the intermediate gear 214 and the transmission bevel gear 216, rotating the upper cutting blade 242 and the lower cutting blade 240 for bush cutting operation.

Normally, a bush cutter is operated with a handle provided on a handle pole gripped to swing a cutting blade right and left. Long-time use causes insufficient engagement or excessive engagement between bevel gears.

The driving bevel gear 204 and the transmission bevel gear 216 in the above bush cutter, however, are not movable relative to the gearbox 208 and the cylinder 220. It is thus impossible to adjust engagement when insufficient engagement or excessive engagement occurs. There is thus a demand for a bush cutter in which a fine adjustment of engagement is possible when insufficient engagement or excessive engagement occurs between bevel gears.

Japanese Utility Model Laid-Open Publication No. SHO-59-157116 discloses a bush cutter in which a cutting blade is rotated via a driving bevel gear and a driven bevel gear. A gear mechanism of this bush cutter will be described with reference to FIG. 12.

Referring to FIG. 12, a driving bevel gear 304 is spline-connected with a distal end portion of a driving shaft 302 inserted into a handle pole 300. The driving bevel gear 304 is rotatably supported by a gearbox 308 via a bearing device 306. The driving force of the driving bevel gear 304 is transmitted to a cutting blade 314 via a driven bevel gear 310 and an output shaft 312 for cutting weeds.

The bearing device 306 has an oil impregnated sintered bearing 318 fixed in the gearbox 308 with a screw 316, and a plurality of needle bearings 320 contained in the oil impregnated sintered bearing 318.

A boss 322 of the driving bevel gear 304 is rotatably inserted into a bearing hole 324 formed in the oil impregnated sintered bearing 318.

The bearing device 306 has previously been filled with lubricating oil which is, however, likely to run out by long-time use. In this case, it is necessary to remove the screw 316 to remove the driving bevel gear 304 and the bearing device 306 from the gearbox 308, and then to refill the oil impregnated sintered bearing 318 and another bearing (e.g., a bearing for an output shaft) with lubricating oil, which is time-consuming and troublesome work.

There is thus a demand for a bush cutter in which bearings can be easily supplied with lubricating oil without disassembling a gear mechanism and a gearbox when supplying lubricating oil.

SUMMARY OF THE INVENTION

According to the present invention, there is provided a bush cutter which comprises a driving shaft rotationally driven by a drive source; a handle pole into which the driving shaft is inserted; a gearbox fixed at a distal end portion of the handle pole; a driving bevel gear housed in the gearbox and mounted on a distal end portion of the driving shaft to be rotated by rotation of the driving shaft; a driven bevel gear engaging the driving bevel gear; an output shaft to be rotated by rotation of the driven bevel gear; a cutting blade mounted on the output shaft; a first bearing rotatably supporting the driving bevel gear and fitted in an axially longitudinally movable manner relative to the gearbox to allow adjustment of engagement with the driven bevel gear; and second and third bearings rotatably supporting opposite ends of the output shaft.

The first bearing preferably comprises a screw-in support member screwed into the gearbox and fitted in the gearbox in an axially longitudinally movable manner; and a first journal bearing supported by the screwin support member and rotatably supporting a boss of the driving bevel gear.

Thus, the screw-in support member can be finely adjusted in position by its rotation to set the driving bevel gear in a desired position, allowing fine adjustment of engagement with the driven bevel gear to improve the precision of engagement between the bevel gears. The fine adjustment of engagement between the bevel gears allows reductions in noise and vibration caused by wrong engagement between the bevel gears.

The screw-in support member preferably has engaging slots formed in a rear end portion thereof to be engaged with a screwing tool. Only by engaging the screwing tool with the engaging slot and rotating the screw-in support member, the engagement of the driving bevel gear with the driven bevel gear can be easily adjusted.

In this invention, preferably, the second bearing has a second journal bearing rotatably supporting the output shaft and an oil passage hole extending through front and rear surfaces of a second bearing body; and the output shaft has an oil flow path extending from an end at which the second bearing is located to outer peripheral surfaces contacting the second and third bearings. That is, when rotation of the driving bevel gear, driven bevel gear and output shaft in the gear box provides good fluidity to grease, the fluid grease passes through the oil passage hole extending through the front and rear surfaces of the second bearing body to reach the end of the output shaft. The grease reaching the end is led by the oil flow path to reach the outer peripheral surfaces contacting the second and third bearings.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
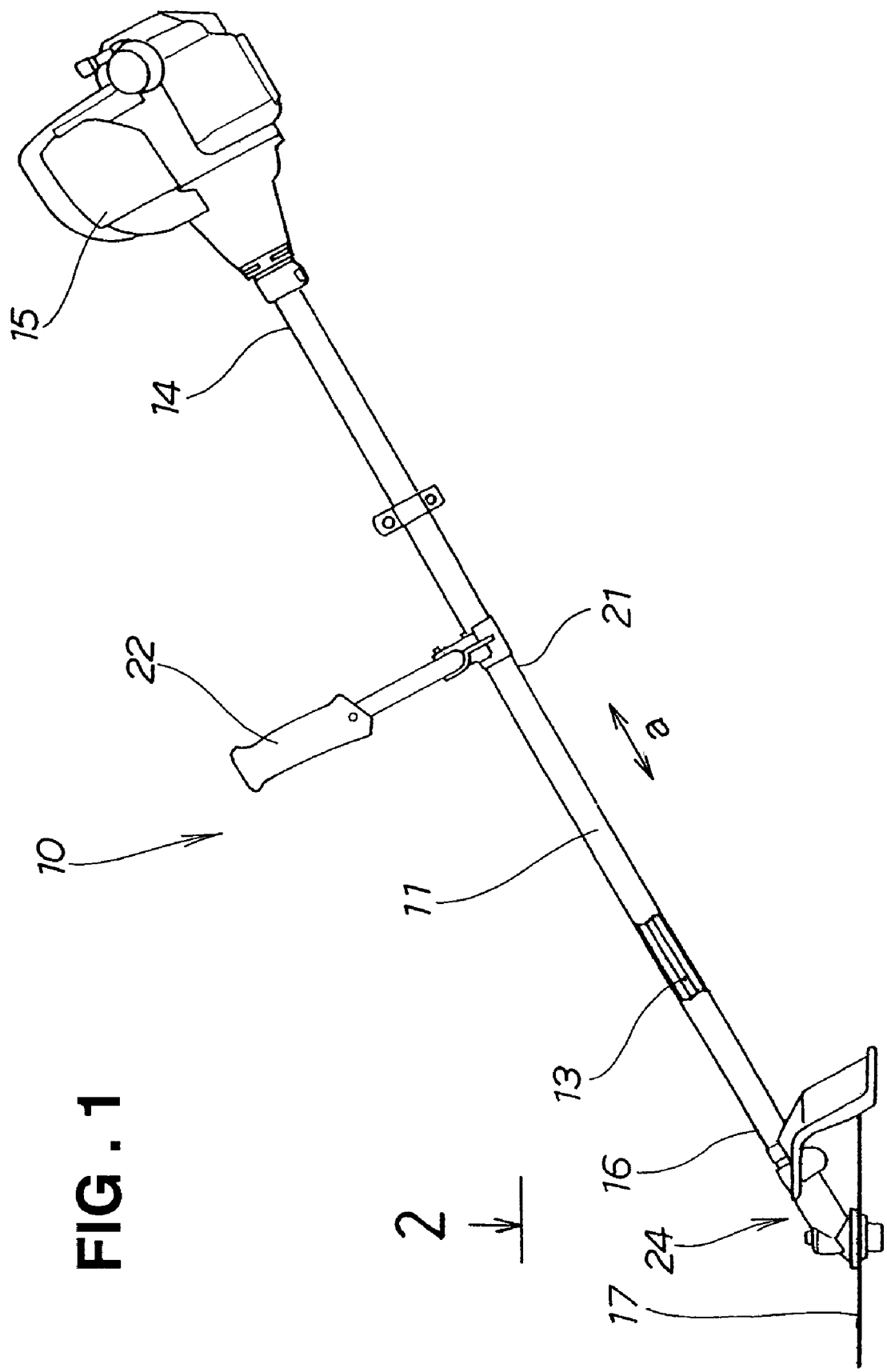
FIG. 1 is a side view of a bush cutter according to the present invention.

A bush cutter 10 shown in FIG. 1 has a driving shaft 13 inserted into a hollow handle pole 11, which driving shaft 13 is rotated by a drive source 15 provided at a proximal end 14 of the handle pole 11 to rotate a cutting blade 17 provided at the side of a distal end portion 16 of the handle pole 11 for cutting weeds or the like. The handle pole 11 has a handle 22 provided on its longitudinally substantially middle portion. Reference numeral 24 denotes a gearbox. The drive source 15 may be an engine or an electric motor.

Figure 2:
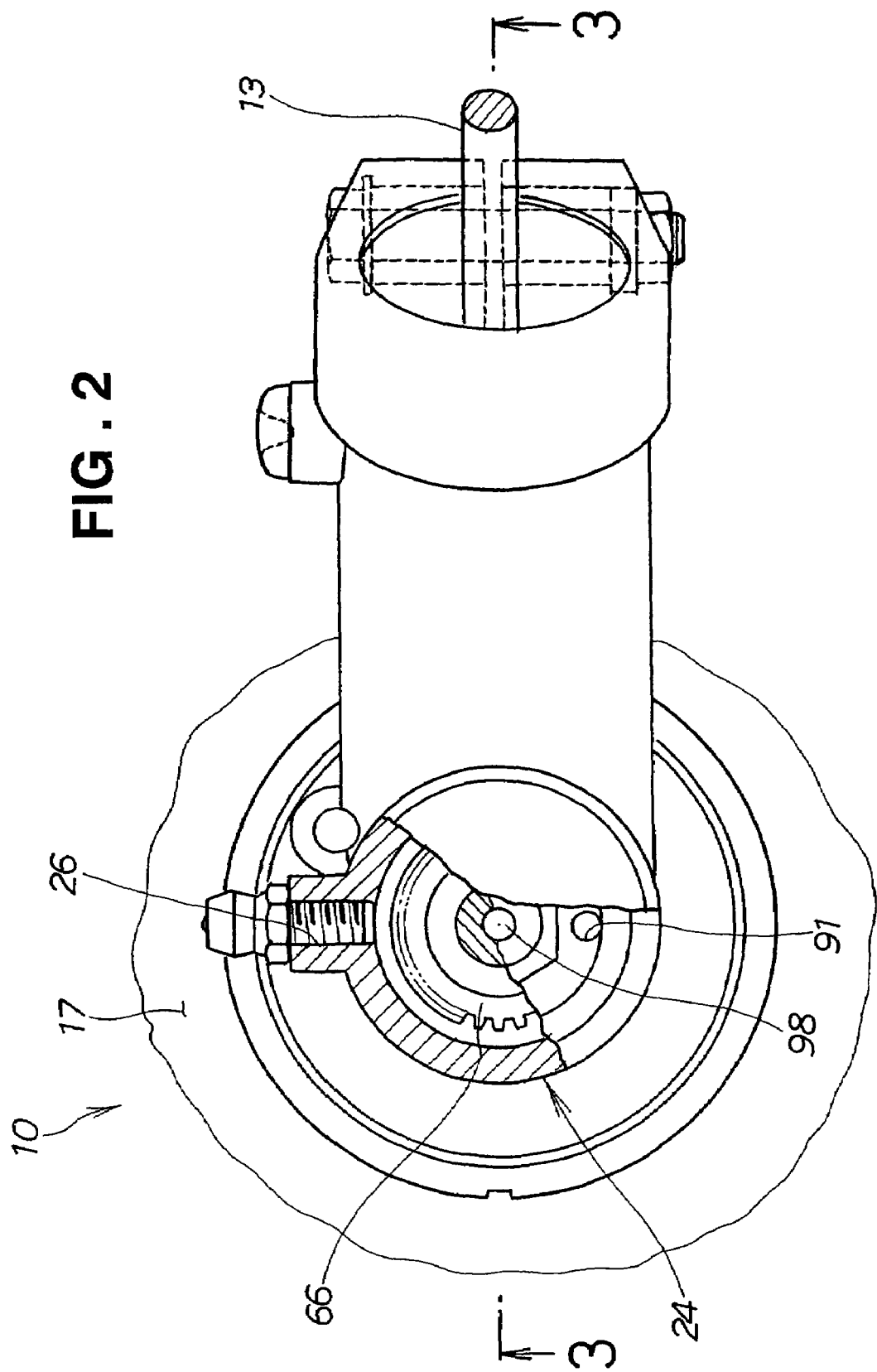
FIG. 2 is a view taken in the direction of arrow 2 in FIG. 1, illustrating a gearbox having a grease inlet.

As shown in FIG. 2, the gearbox 24 is formed with a grease inlet 26. A grease pump is connected to the grease inlet 26 to inject grease into the gearbox 24 to supply it as lubricating oil to bearings which will be described below.

Figure 3:
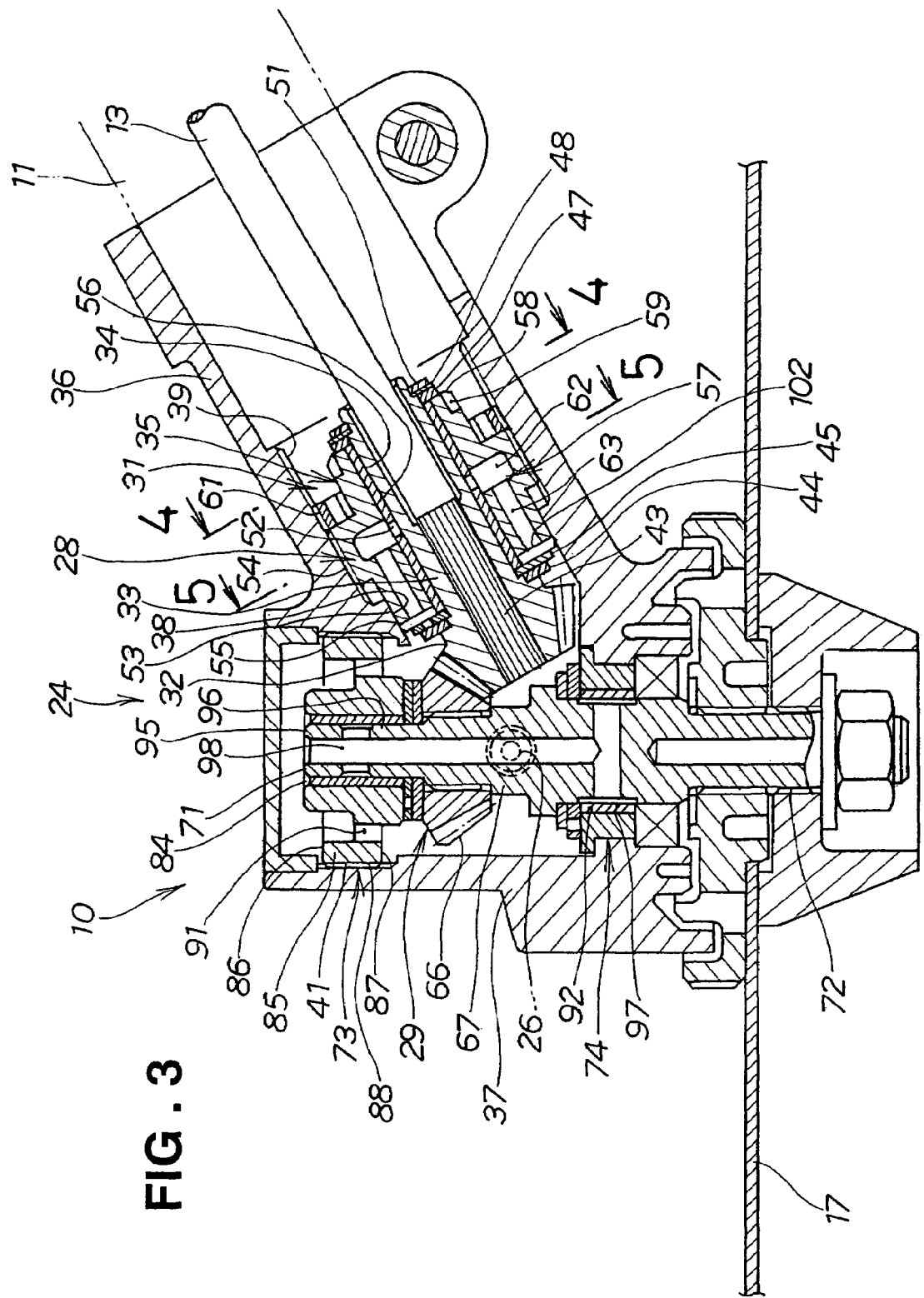
FIG. 3 is a cross-sectional view taken along line 3-3 in FIG. 2, illustrating a bevel gear mechanism according to this invention.

As shown in FIG. 3, the gearbox 24 consists of a first box 36 and a second box 37 formed in one unit. The first box 36 is fitted to a distal end portion of the handle pole 11.

The bush cutter 10 is provided with a driving mechanism 28 and a driven mechanism 29. The driving mechanism 28 is housed in the first box 36 of the gearbox 24. The driven mechanism 29 is housed in the second box 37. The driving mechanism 28 has a first bearing 31 and a driving bevel gear 32. The first bearing 31 includes a first journal bearing 34 in a pipe shape and a tubular screw-in support member 35 having a hollow portion. The first journal bearing 34 is fitted into the hollow portion of the screw-in support member 35.

The tubular screwin support member 35 has, on an outer peripheral surface thereof, an external male thread 54 which is screwed into an internal female thread 39 formed on an inner peripheral surface of the first box 36 to be screwed to the inside of the first box 36. At that time, a distal end portion of the screw-in support member 35 is fitted into a fitting hole 38 of the first box 36. Thus, the screw-in support member 35 is movable or displaceable in an axially longitudinal direction of the driving shaft 13.

A boss 33 of the driving bevel gear 32 is fitted into a hollow portion of the first journal bearing 34 with first and second ring members 44, 45 interposed therebetween. Third and fourth ring members 47, 48 are fitted onto a rear end portion of the boss 33 and fixed with a snap ring 51 to prevent the boss 33 from moving in an axially longitudinal direction of the first journal bearing 34. Consequently, the driving bevel gear 32 moves with the movement of the screw-in support member 35 in an axially longitudinal direction of the driving shaft 13 to be finely adjusted in engagement with a driven bevel gear 66 which will be described below. The driving bevel gear 32 is connected with the driving shaft 13 by a spline 43 to rotate with the rotation of the driving shaft 13.

The first journal bearing 34 has oil holes 52 and an inner peripheral surface 56.

Figure 9:
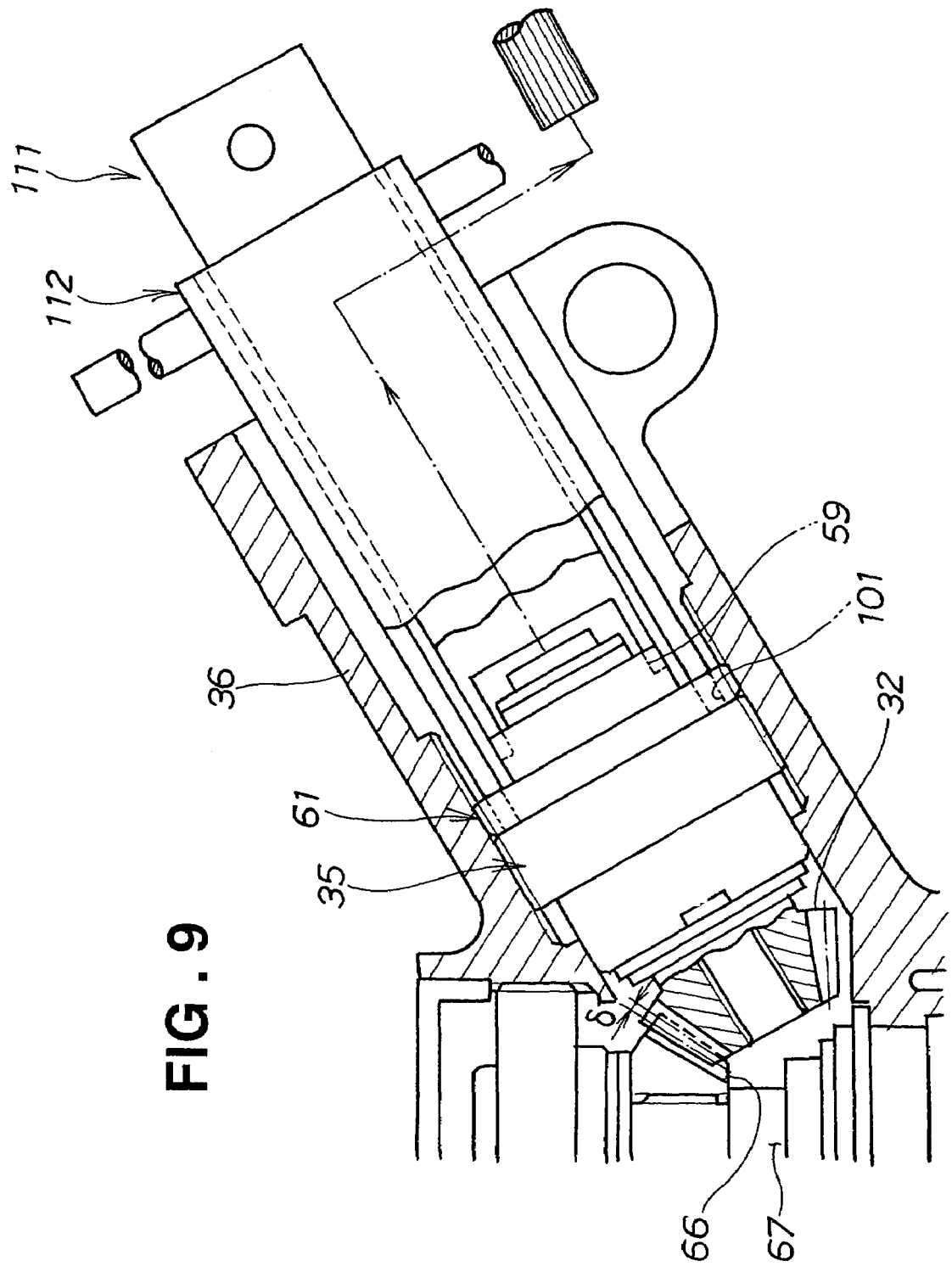

The screw-in support member 35 has, at its distal end portion, a fitting portion 53 to fit into the fitting hole 38 of the first box 36 as described above. The screw-in support member 35 also has a lubricating oil passage 57 extending from its front end 55 to the inner peripheral surface 56 of the first journal bearing 34. Engaging portions in the form of slots 59 to be engaged with a screwing tool 111 shown in FIG. 9 are formed in a rear end portion 58 of the screw-in support member 35. Reference numeral 61 denotes a loosening prevention member for preventing loosening of screwing of the screw-in support member 35 relative to the first box 36.

The lubricating oil passage 57 includes a passage portion 62 formed in an annular shape, holes 63 communicating with the passage portion 62, and the oil holes 52.

The driven mechanism 29 has the driven bevel gear 66 engaging the driving bevel gear 32, an output shaft 67 supporting the driven bevel gear 66 to be rotated by rotation of the driven bevel gear 66, and second and third bearings 73, 74 supporting opposite ends 71, 72 of the output shaft 67.

The second bearing 73 includes a second journal bearing 84 fitted into the output shaft 67, and an oil passage hole 91 extending through front and rear surfaces 86, 87 of a bearing body 85 of the second bearing 73. A male thread 88 is formed on the periphery of the bearing body 85 of the second bearing 73. The bearing body 85 is screw-fitted into a female thread 41 formed on the inner periphery of the second box 37.

The third bearing 74 has a third journal bearing 92.

The output shaft 67 has an oil flow path 98 formed from a top end 95 at which the second bearing 73 is located to outer peripheral surfaces 96, 97 contacting the second and third bearings 73, 74.

Figure 4:
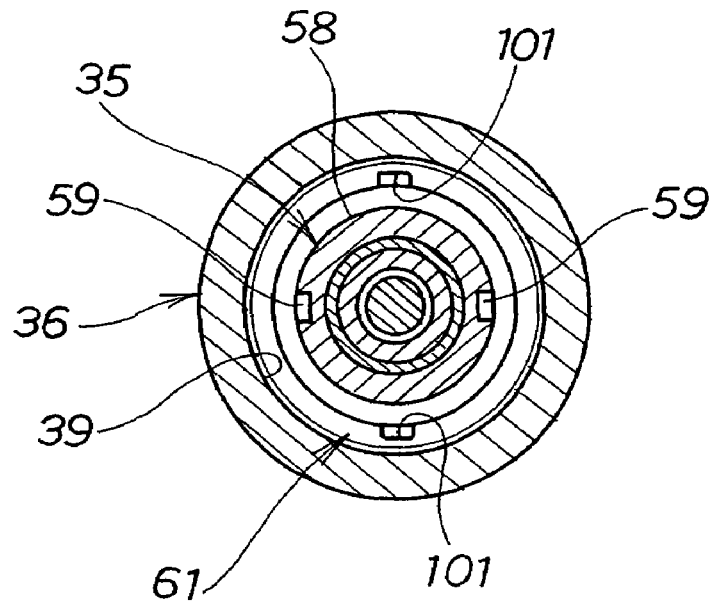
FIG. 4 is a cross-sectional view taken along line 4-4 in FIG. 3.

As shown in FIG. 4, the screw-in support member 35 is formed in its peripheral end portion 58 with the engaging slots 59, 59. The engaging slots 59, 59 are engaged with a screwing tool when the screw-in support member 35 is screwed into the first box 36. The loosening prevention member 61 also has slots 101, 101 to engage a tool.

Figure 5:
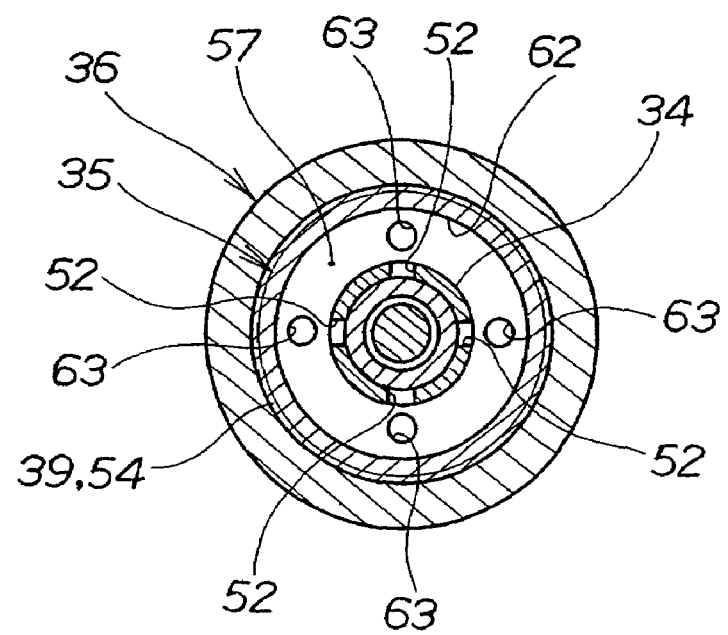
FIG. 5 is a cross-sectional view taken along line 5-5 in FIG. 3.

FIG. 5 illustrates the annular passage portion 62, four holes 63 extending in an axially longitudinal direction, and four oil holes 52 formed in the first journal bearing 34, which constitute the lubricating oil passage 57 formed in the screw-in support member 35.

Figure 6:
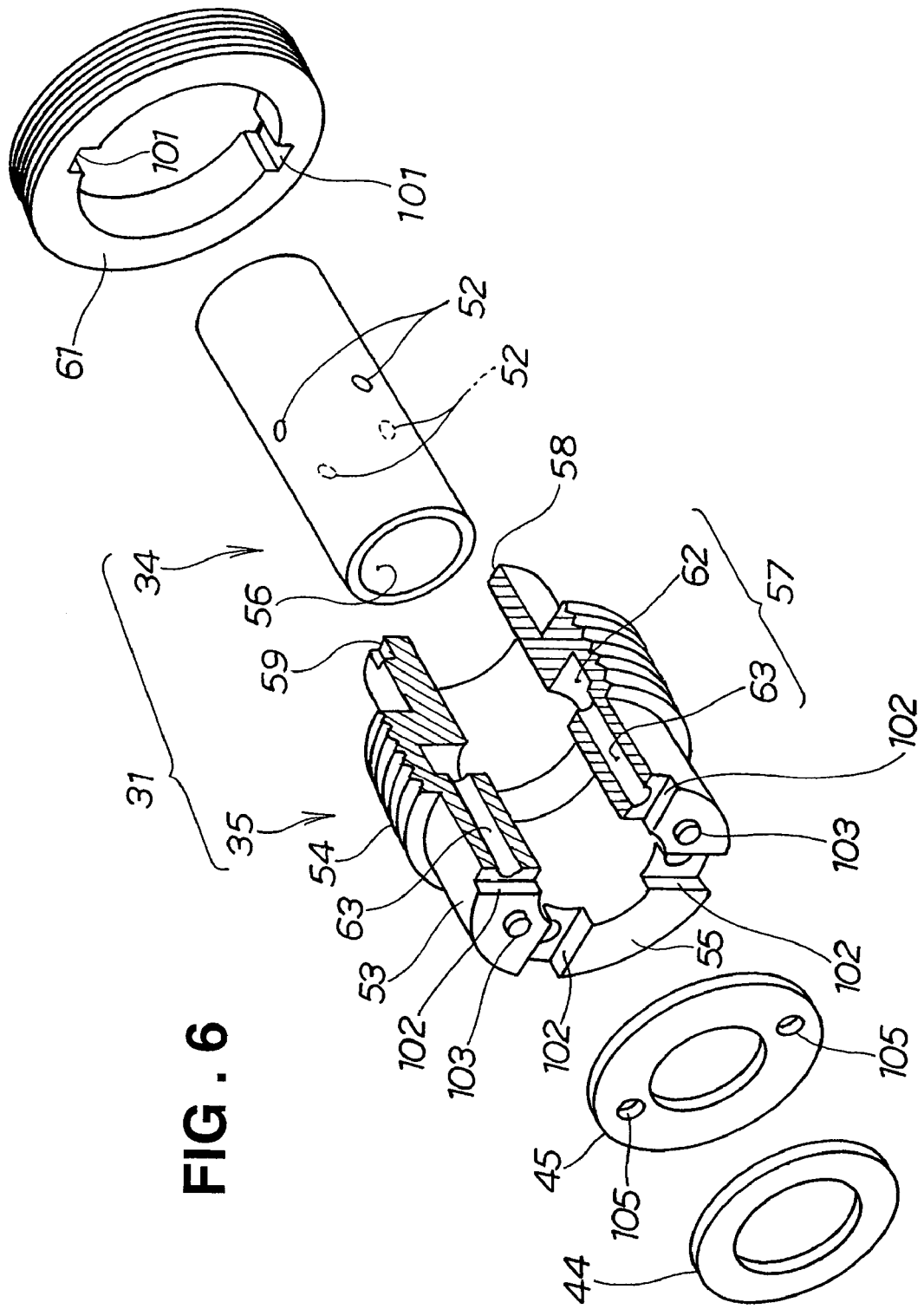
FIG. 6 is a perspective view of a screw-in support member and a first journal bearing shown in FIG. 3.

FIG. 6 illustrates the first journal bearing 34 and the screw-in support member 35 which constitute the first bearing 31.

The screw-in support member 35 has, as described above, the fitting portion 53 to fit into the first box 36 (see FIG. 3), the male thread 54, the passage portion 62 and the four holes 63 of the lubricating oil passage 57 extending from the front end 55 to the inner peripheral surface 56 of the first journal bearing 34, and the engaging slots 59 formed in the rear end portion 58.

The front end 55 is formed with four communicating grooves 102 correspondingly communicating with the four holes 63, respectively. The front end 55 also has two locating projections 103, 103 which are fitted into locating holes 105, 105 formed in the second ring member 45.

The communicating grooves 102 lead lubricating oil to the first journal bearing 34 through the lubricating oil passage 57.

The first journal bearing 34 is formed with the four oil holes 52.

Now, the order in which to fit the driving mechanism 24 and the driven mechanism 29 into the gearbox 24 will be described with reference to FIGS. 7 to 9.

Figure 7:
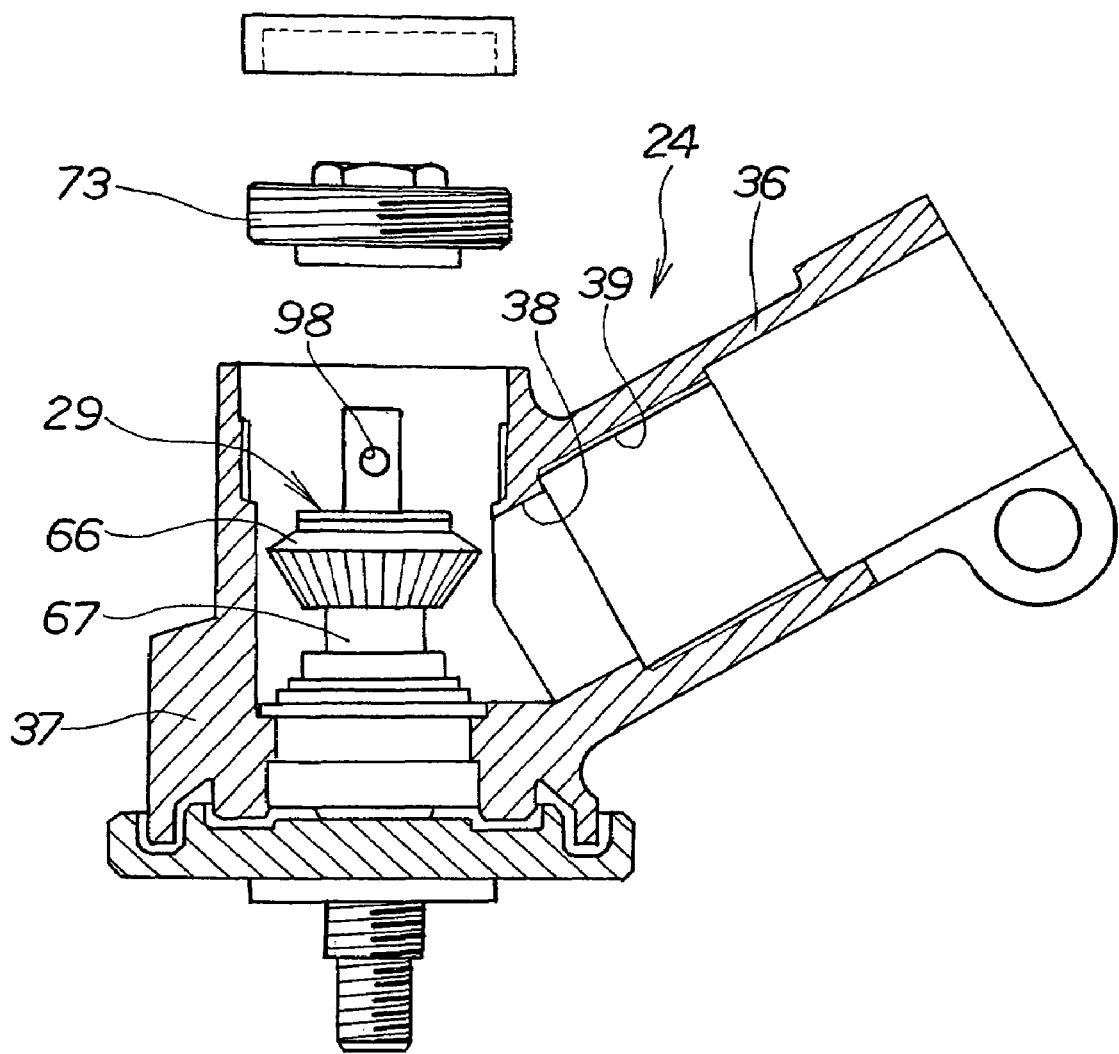
FIGS. 7 to 9 are diagrams illustrating the order in which to fit a driven bevel gear and a driving bevel gear into a gearbox.

First, as shown in FIG. 7, the driven mechanism 29 is placed in the second box 37. Specifically, the driven bevel gear 66 and the output shaft 67 are fitted in one unit into the second box 37. Then, the second bearing 73 is screwed into the female thread 41 of the second box 37 to fix the driven mechanism 29 in the second box 37 via the second bearing 73.

Figure 8:
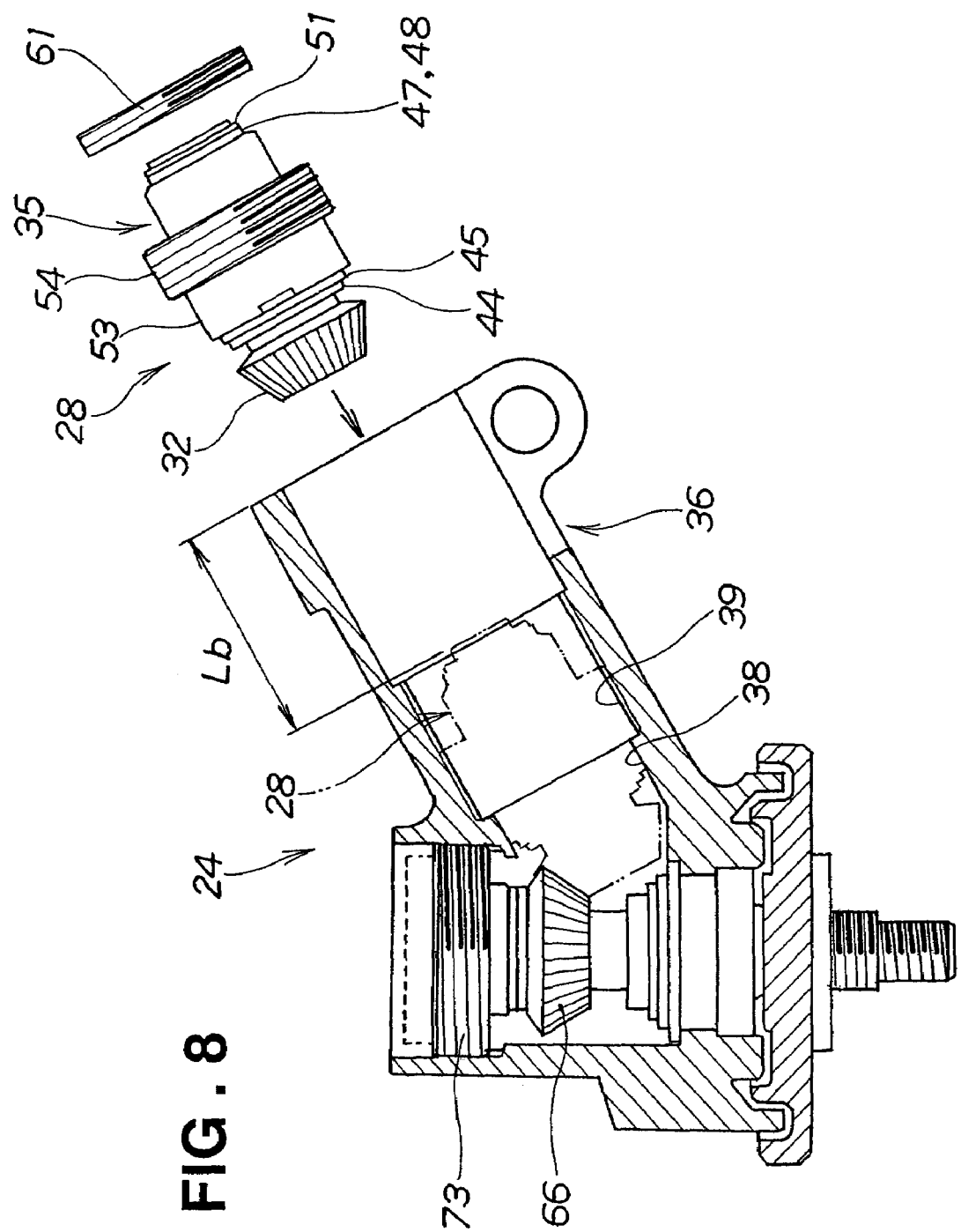

Then, as shown in FIG. 8, the driving mechanism 28 is fitted into the first box 36. Specifically, the first and second ring members 44, 45, the first journal bearing 34 (see FIG. 6), the screw-in support member 35 and the third and fourth ring members 47, 48 are fitted onto the driving bevel gear 32 and fixed by the snap ring 51. Then, using the screwing tool 111 (see FIG. 9), the male thread 54 of the screw-in support member 35 is manually screwed into the female thread 39 of the first box 36 to screw the driving mechanism 28 into the first box 36 to a measure distance Lb as shown in chain lines. Then, the loosening prevention member 61 is screwed in with a tool 112 (see FIG. 9) to fix the driving mechanism 28 in the first box 36.

Finally, as shown in FIG. 9, the screw-in support member 35 is manually rotated or turned to displace the driving bevel gear 32 toward or away from the driven bevel gear 66 to finely adjust the axially longitudinal position of the driving bevel gear 32, canceling out an excess or deficiency of dimension δ of mesh with the driven bevel gear 66. In this manner, engagement between the driving bevel gear 32 and the driven bevel gear 66 can be easily adjusted to improve the precision of mesh. Further, noise and vibration caused by wrong engagement is reduced.

After the adjustment of engagement is completed, the loosening prevention member 61 is screwed into the first box 36 to fix the screw-in support member 35 in the first box 36.

Since the screw-in support member 35 has the engaging portions or slots 59 in the rear end portion 58 as shown in FIG. 6, only be engaging the screwing tool 111 shown in FIG. 9 with the engaging slots 59 and manually rotating or turning the screw-in support member 35, engagement of the driving bevel gear 32 can be easily adjusted.

Figure 10:
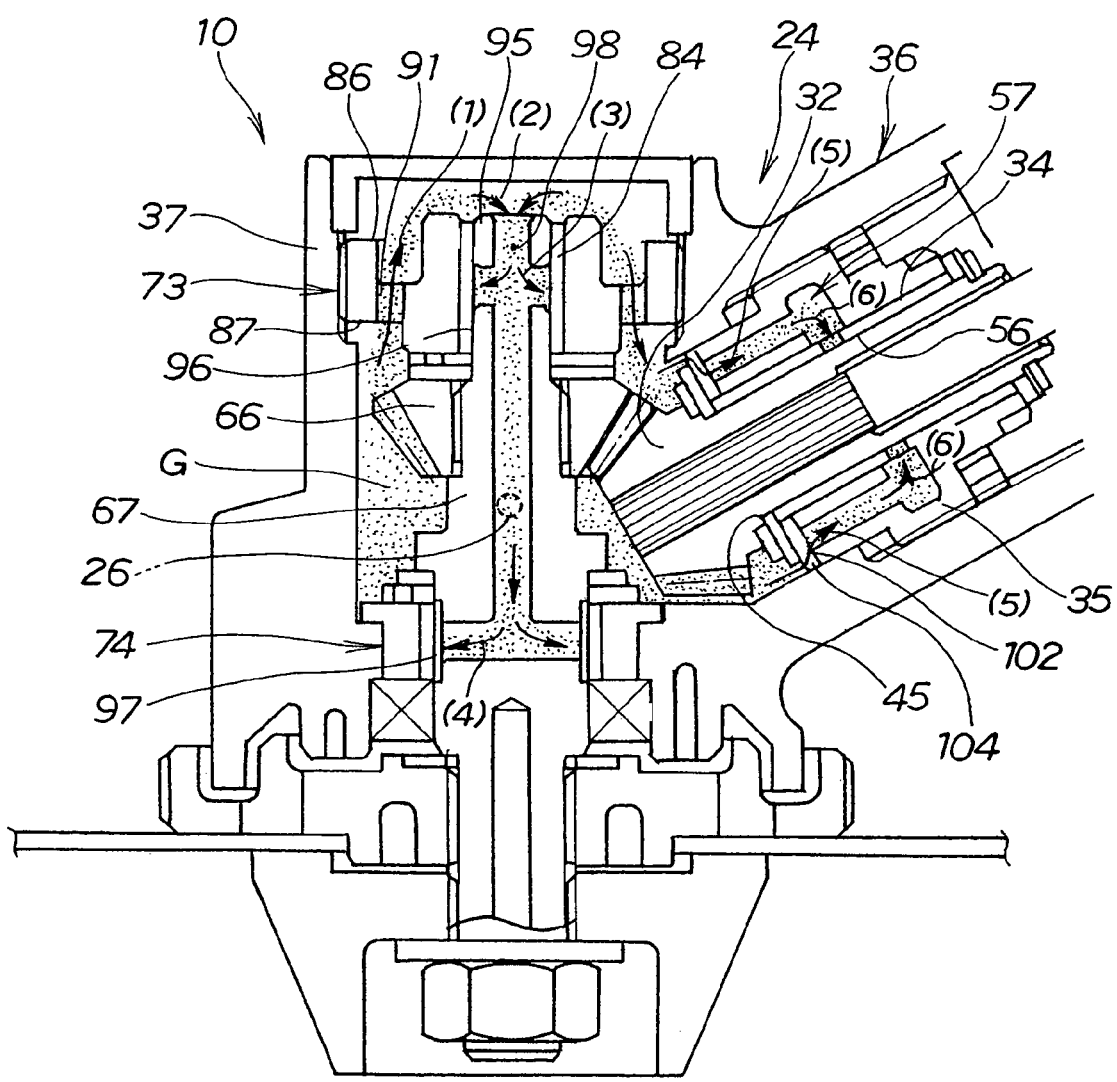
FIG. 10 is a diagram illustrating grease injected into the gearbox, being supplied to bearings.
Figure 11:
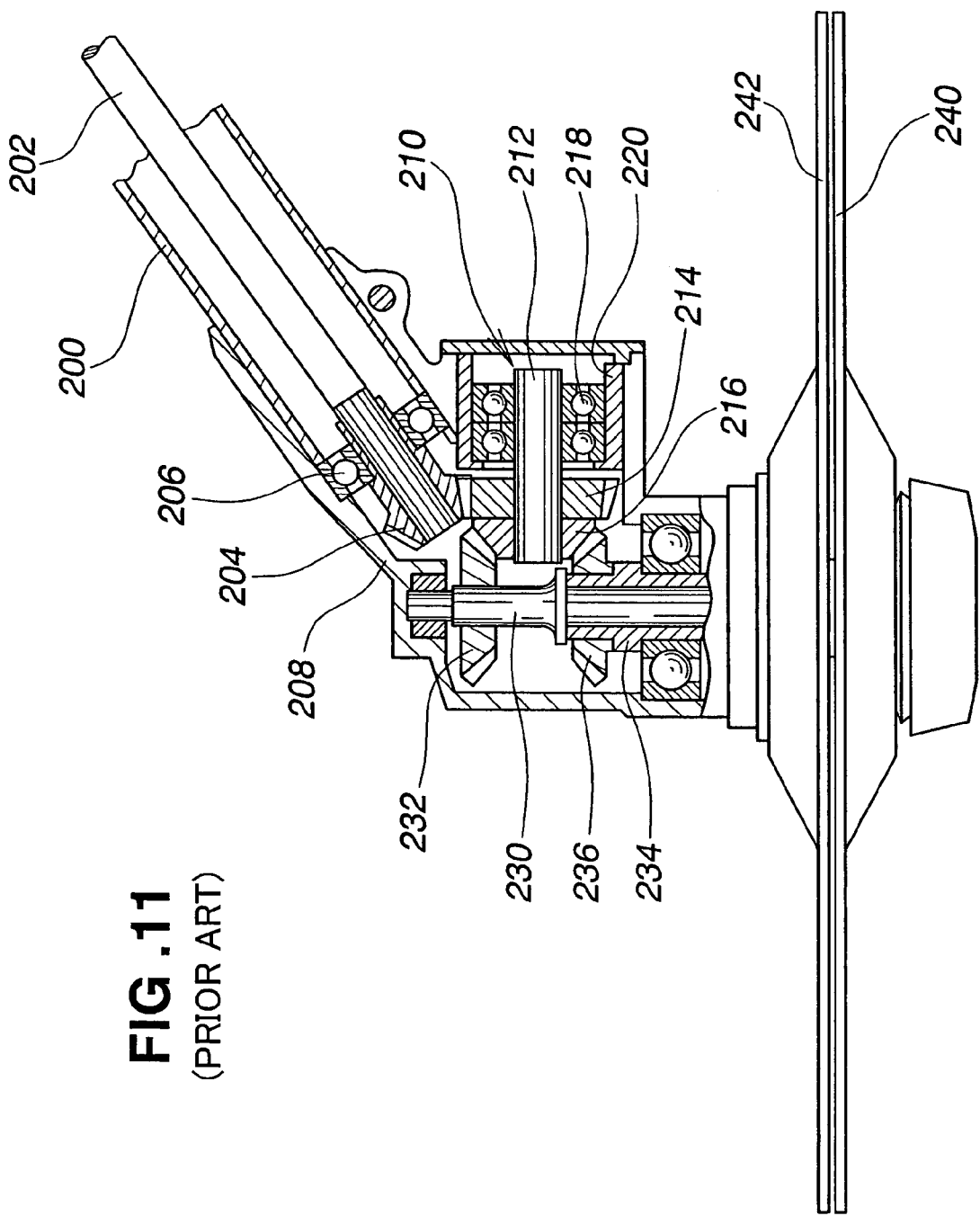
FIG. 11 is a cross-sectional view of a conventional bush cutter bevel gear mechanism.
Figure 12:
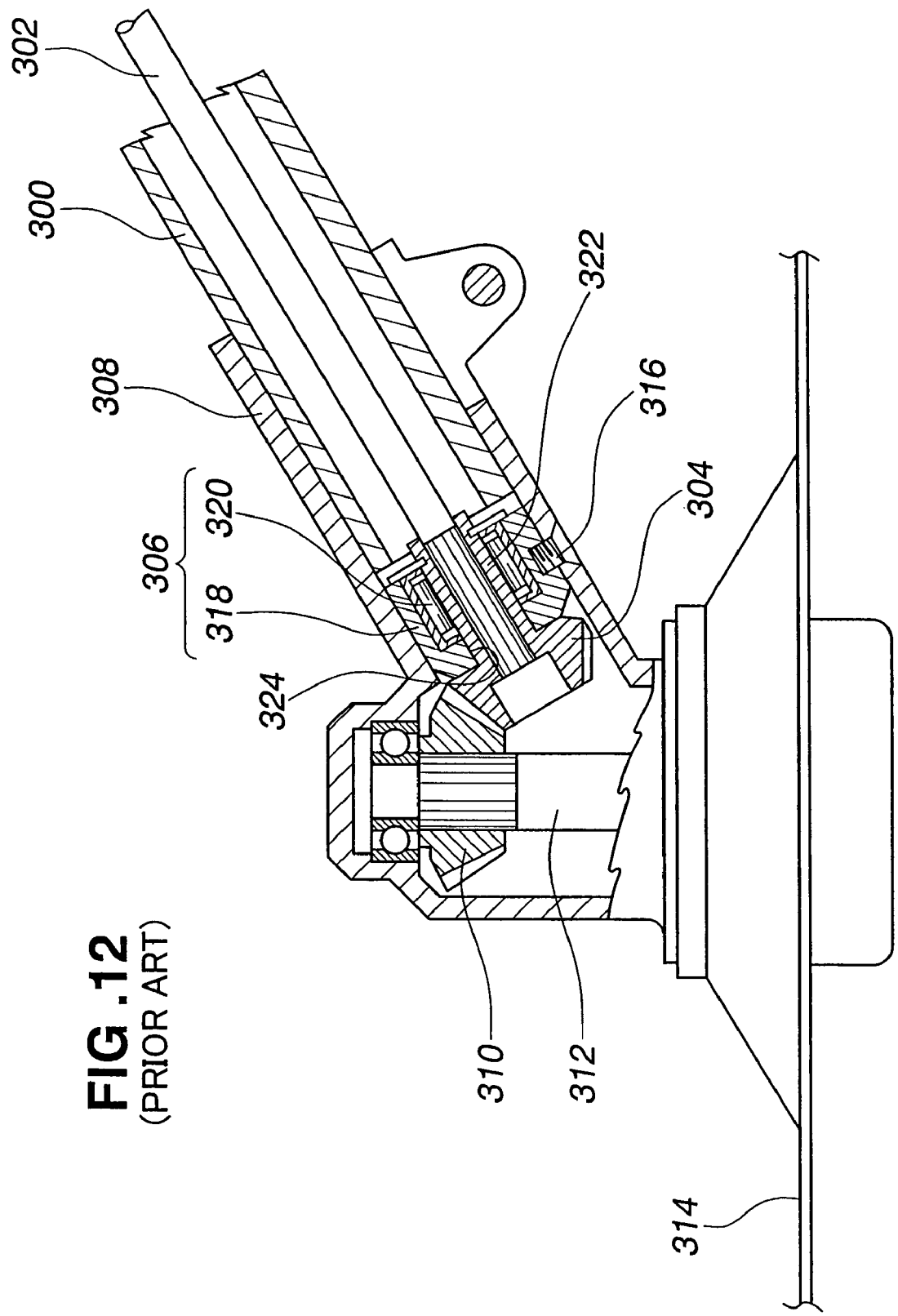
FIG. 12 is a cross-sectional view of a conventional bush cutter bevel gear bearing.

Now, the flow of lubricating oil reaching the first, second and third bearings 31, 73, 74 will be described with reference to FIG. 10.

A given amount of grease G is injected from the grease inlet 26 into the second box 37 of the gearbox 24. When the bush cutter 10 is cutting weeds, the rotation of the driving bevel gear 32, driven bevel gear 66 and output shaft 67 causes the grease G to be stirred, increasing the temperature of the grease G. Thus, the grease G becomes fluid.

By the centrifugal force produced by the driving bevel gear 32, driven bevel gear 66 and output shaft 67, the fluid grease G passes through the oil passage hole 91 extending through the front and rear surfaces 86, 87 of the second bearing 73 as shown by arrow (1) in the second box 37, and reaches the top end 95 of the output shaft 67 as shown by arrow (2). The grease G reaching the top end 95 is led by the oil flow path 98 to reach the outer peripheral surfaces 96, 97 contacting the second and third bearings 73, 74 as shown by arrows (3), (4).

In the first box 36, the fluid grease G passes through the grooves 102 formed in the screw-in support member 35 as shown by arrows (5), (5) by the centrifugal force produced by the driving bevel gear 32, driven bevel gear 66 and output shaft 67, and led by the lubricating oil passage 57 to the inner peripheral surface 56 of the first journal bearing 34 as shown by arrow (6).

Obviously, various minor changes and modifications of the present invention are possible in the light of the above teaching. It is therefore to be understood that within the scope of the appended claims the invention may be practiced otherwise than as specifically described.

What is claimed is:

1. A bush cutter comprising:
a handle pole having proximal and distal end portions;
a driving shaft extending lengthwise through the handle pole;
a drive source disposed at the proximal end portion of the handle pole for rotationally driving the driving shaft;
a gearbox fixed at the distal end portion of the handle pole,
a driving bevel gear housed in the gearbox and mounted on a distal end portion of the driving shaft to be rotated by rotation of the driving shaft;
a driven bevel gear engaging with and rotationally driven by the driving bevel gear;
an output shaft connected to be rotated by rotation of the driven bevel gear;
a cutting blade mounted on the output shaft;
a first bearing rotatably supporting the driving bevel gear and mounted in an axially longitudinally movable manner relative to the gearbox to allow adjustment of engagement of the driving bevel gear with the driven bevel gear, the first bearing comprising a screw-in support member having a male thread formed on an outer peripheral surface thereof and threadedly engaged with a female thread formed on an inner peripheral surface of the gearbox so that turning of the screw-in support member in either direction effects axial longitudinal movement thereof relative to the gearbox to thereby adjust engagement of the driving bevel gear with the driven bevel gear, and a first journal bearing supported by the screw-in support member and rotatably supporting a boss of the driving bevel gear; and second and third bearings rotatably supporting opposite ends of the output shaft.

2. A bush cutter as set forth in claim 1; wherein the screw-in support member has engaging slots formed in a rear end portion thereof for engaging with a screwing tool.

3. A bush cutter as set forth in claim 1; wherein the second bearing has second journal bearing rotatably supporting the output shaft and an oil passage hole extending through front and rear surfaces of a second bearing body, and the output shaft has an oil flow path extending from an end at which the second bearing is located to outer peripheral surfaces contacting the second and third bearings.

4. A bush cutter comprising: a handle pole having a rotary driving shaft extending lengthwise therethrough; a drive source at one end of the handle pole for rotationally driving the driving shaft; a gearbox at the other end of the handle pole, the gearbox containing therein a driving bevel gear connected to and rotationally driven by the driving shaft, a driven bevel gear in meshing engagement with and rotationally driven by the driving bevel gear, the driving bevel gear being displaceable toward and away from the driven bevel gear to adjust the meshing engagement between the driving and driven bevel gears, a bearing rotatably mounting the driving bevel gear in the gearbox, and a tubular support member in which is fitted the bearing, the tubular support member being threaded into the gearbox and having engaging portions engageable with a tool manually insertable in the gearbox to enable the tubular support member to be adjustably displaced in the gearbox in response to turning of the tubular support member by the tool to thereby displace the bearing and the driving bevel gear; an output shaft connected to be rotationally driven by the driven bevel gear; and a cutting blade connected to the output shaft.

5. A bush cutter as set forth in claim 4; wherein the engaging portions comprise slots.

6. A bush cutter comprising: a handle pole having a rotary driving shaft extending lengthwise therethrough; a drive source at one end of the handle pole for rotationally driving the driving shaft; a gearbox at the other end of the handle pole, the gearbox containing therein a driving bevel gear connected to and rotationally driven by the driving shaft, a driven bevel gear in meshing engagement with and rotationally driven by the driving bevel gear, the driving bevel gear being displaceable toward and away from the driven bevel gear by a tool manually insertable into the gearbox to adjust the meshing engagement between the driving and driven bevel gears, a tubular support member having external threads engaging with internal threads on the gearbox and having engaging portions engageable with the tool such that turning of the tool in opposite directions effects displacement of the tubular support member in opposite directions, and a bearing fitted in the tubular support member and rotatably supporting the driving bevel gear, whereby displacement of the tubular support member by the tool effects corresponding displacement of the bearing and the driving bevel gear to thereby adjust the meshing engagement between the driving and driven bevel gears; an output shaft connected to be rotationally driven by the driven bevel gear; and a cutting blade connected to the output shaft.

7. A bush cutter as set forth in claim 6; wherein the engaging portions of the tubular support member comprise slots.

8. A bush cutter as set forth in claim 6; wherein the driving bevel gear has a boss rotatably supported by the bearing, the boss being connected to the driving shaft for rotation therewith.

9. A bush cutter as set forth in claim 8; wherein the boss is connected to the driving shaft by a spline connection.

* * * * *